United States Patent
Joe et al.

(10) Patent No.: US 9,107,070 B2
(45) Date of Patent: Aug. 11, 2015

(54) SYSTEM AND METHOD FOR SETTING ADAPTIVE HANDOFF PARAMETERS

(75) Inventors: Yang Hwan Joe, Goyang-si (KR); You Chang Ko, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 476 days.

(21) Appl. No.: 13/303,775

(22) Filed: Nov. 23, 2011

(65) Prior Publication Data

US 2012/0134339 A1    May 31, 2012

(30) Foreign Application Priority Data

Nov. 26, 2010   (KR) .................. 10-2010-0118910

(51) Int. Cl.
*H04W 4/00* (2009.01)
*H04W 12/06* (2009.01)
*H04W 48/14* (2009.01)

(52) U.S. Cl.
CPC .............. *H04W 12/06* (2013.01); *H04W 48/14* (2013.01)

(58) Field of Classification Search
USPC .......................................... 370/331; 455/411
See application file for complete search history.

(56) References Cited

U.S. PATENT DOCUMENTS

| | | | |
|---|---|---|---|
| 7,421,268 B2 | 9/2008 | Lee et al. | |
| 8,346,258 B2 | 1/2013 | Kitaji | |
| 2003/0060201 A1 | 3/2003 | Soliman | |
| 2004/0192221 A1 | 9/2004 | Matsunaga | |
| 2005/0118946 A1* | 6/2005 | Colban et al. | 455/3.06 |
| 2007/0060105 A1 | 3/2007 | Batta | |
| 2008/0076428 A1* | 3/2008 | Jagadeesan et al. | 455/436 |
| 2009/0028120 A1* | 1/2009 | Lee | 370/338 |
| 2009/0170476 A1 | 7/2009 | Lin et al. | |

FOREIGN PATENT DOCUMENTS

| | | |
|---|---|---|
| CN | 101300877 A | 11/2008 |
| CN | 101662807 A | 3/2010 |
| JP | 2004-222300 A | 8/2004 |
| JP | 2004-304399 A | 10/2004 |
| JP | 2008-301121 A | 12/2008 |

(Continued)

OTHER PUBLICATIONS

Communication dated Mar. 28, 2012 from the European Patent Office in counterpart European application No. 11190539.4.
Shin et al, "Improving the Latency of 802.11 Hand-offs using Neighbor Graphs," ACM, 2 Penn Plaza, Suite 701, New York, 2004.
Communication, dated Nov. 26, 2013, issued by the State Intellectual Property Office of PR China in counterpart Chinese Patent Application No. 201110397791.2.

(Continued)

*Primary Examiner* — Phuongchau Ba Nguyen
(74) *Attorney, Agent, or Firm* — Sughrue Mion, PLLC

(57) ABSTRACT

Provided are a system and method for setting an adaptive set of handoff parameters. The system includes a user terminal configured to transmit an authentication request to a network and receive a set of handoff parameters from the network; an access point (AP) belonging to the network and configured to receive the authentication request from the user terminal, transmit the authentication request to a central management server, receive the set of handoff parameters from the central management server, and transmit the set of handoff parameters to the user terminal; and the central management server, which is configured to store and manage a plurality of network-specific sets of handoff parameters for one or more networks, authenticate the user terminal using the authentication request received from the AP, and transmit a set of handoff parameters of a network to which the authenticated user terminal connects to the AP.

17 Claims, 3 Drawing Sheets

(56) References Cited

FOREIGN PATENT DOCUMENTS

| | | | |
|---|---|---|---|
| KR | 10-0740910 A | 7/2007 | |
| WO | 2007027485 A2 | 3/2007 | |
| WO | WO 2007/027485 A2 * | 3/2007 | ............... H04Q 7/38 |
| WO | 2010018529 A1 | 2/2010 | |
| WO | 2010049757 A1 | 5/2010 | |

OTHER PUBLICATIONS

Communication, dated Jun. 18, 2013, issued by the Japanese Patent Office in counterpart Japanese Patent Application No. 2011-259428.
Communication, dated Dec. 6, 2013, issued by the Japanese Patent Office in counterpart Japanese Patent Application No. 2011-259428.

* cited by examiner

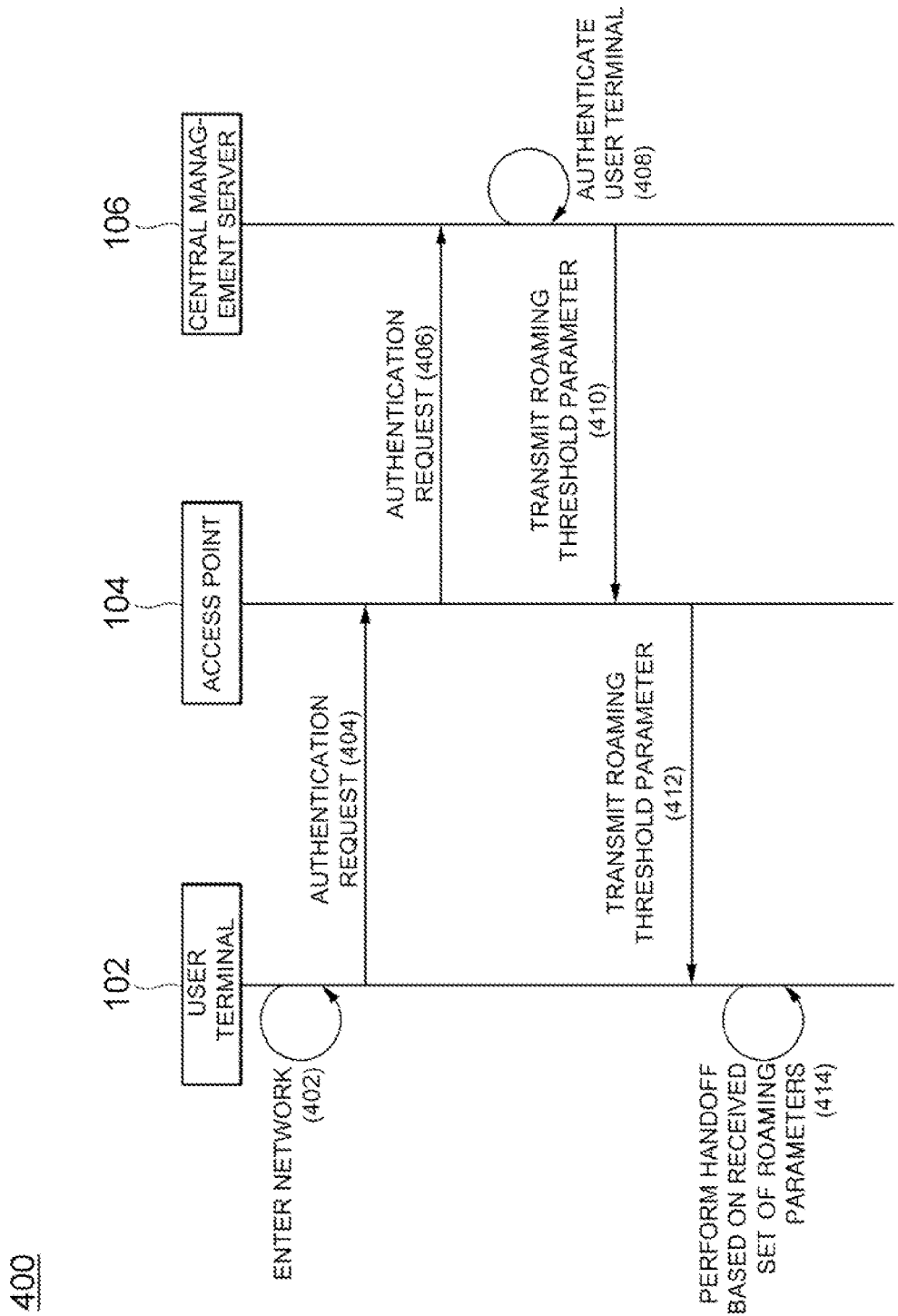

SYSTEM AND METHOD FOR SETTING ADAPTIVE HANDOFF PARAMETERS

CROSS-REFERENCE TO RELATED APPLICATIONS

This application claims priority from and the benefit of Korean Patent Application No. 2010-0118910, filed on Nov. 26, 2010, the disclosure of which is incorporated herein by reference in its entirety.

BACKGROUND

1. Field

The present exemplary embodiments relate to handoff technology in a wireless network such as a wireless local area network (WLAN).

2. Discussion of Related Art

Recently, the widespread use of wireless terminals, such as, for example, smart phones, has driven up demand for wireless communication networks, such as wireless local area networks (WLAN). In general, WLAN has an advantage in that a network is cheaply available and a transmission speed is fast, as compared to a mobile communication network such as a third generation (3G) network. Consequently, WLAN is widely used as a supplement or replacement for the mobile communication network.

At present, there are Institute of Electrical and Electronics Engineers (IEEE) 802.11a/b/g/n standards for WLAN, but they do not explicitly describe a handoff method between access points (APs). Growing demand among users for the seamless use of WLAN on the move has been motivating an increasing amount of research aimed at smoothly supporting a handoff, even in WLAN environments.

SUMMARY

Exemplary embodiments are directed to providing optimum handoff parameters, considering an environment where a network is located, for a handoff between wireless networks.

According to an exemplary embodiment, there is provided a system for setting a set of adaptive handoff parameters per network deployed, including: a user terminal configured to transmit an authentication request to a network and to receive a set of handoff parameters from the network; an access point (AP) belonging to the network that the user terminal enters, and configured to receive the authentication request from the user terminal, transmit the authentication request to a central management server, receive the set of handoff parameters of the network from the central management server, and transmit the set of handoff parameters to the user terminal; and the central management server, which is configured to store and manage a plurality of network-specific sets of handoff parameters for one or more networks, authenticate the user terminal using the authentication request of the user terminal received from the AP, and transmit a set of handoff parameters of a network to which the authenticated user terminal connects to the AP.

According to another exemplary embodiment, there is provided a user terminal including: an authentication requesting unit configured to transmit an authentication request of the user terminal to an AP; a data receiving unit configured to receive a set of handoff parameters of a network to which the AP belongs from the AP when the user terminal is authenticated according to the authentication request; a parameter setting unit configured to set the set of handoff parameters received by the data receiving unit for a handoff between APs within the network; and a handoff control unit configured to perform the handoff between the APs belonging to the network according to the set of handoff parameters set by the parameter setting unit.

According to still another exemplary embodiment, there is provided a central management server including: a database configured to store a plurality of sets of handoff parameters for one or more networks; an authentication unit configured to authenticate a user terminal according to an authentication request received from the user terminal by way of an AP; and a data transmitting unit configured to extract a set of handoff parameters of a network to which the user terminal connects from the database and to transmit the extracted set of handoff parameters to the user terminal.

According to yet another exemplary embodiment, there is provided a method of provisioning an adaptive set of handoff parameters, including: receiving an authentication request from a user terminal; authenticating the user terminal according to the received authentication request; and transmitting a set of handoff parameters of a network to which the user terminal connects when the user terminal is authenticated.

According to yet another exemplary embodiment, there is provided a method of setting a set of adaptive handoff parameters, including: transmitting an authentication request to an AP; receiving a set of handoff parameters of a network to which the AP belongs from the AP; setting handoff parameters for a handoff between APs within the network based on the received set of handoff parameters; and performing a handoff between the APs belonging to the network according to the set handoff parameters.

BRIEF DESCRIPTION OF THE DRAWINGS

The above and other objects, features and aspects will become more apparent to those of ordinary skill in the art by describing in detail exemplary embodiments thereof with reference to the accompanying drawings, in which:

FIG. 4 is a sequence diagram showing a sequence for a provisioning method for provisioning adaptive handoff parameters, according to an exemplary embodiment.

DETAILED DESCRIPTION OF EXEMPLARY EMBODIMENTS

Exemplary embodiments will be described in detail below with reference to the accompanying drawings, and the present inventive concept is not limited thereto.

In the following description, well-known technology related to the present inventive concept is not described in detail in order to keep the present disclosure clear and concise. Terms used herein have been chosen in consideration of functionality of the present inventive concept, and may vary depending on a user's or an operator's intentions, or customs in the art. Therefore, the meanings of terms should be interpreted based on the overall context of the present specification.

These exemplary embodiments are provided so that the present disclosure will be thorough and complete and will fully convey the present inventive concept to those skilled in the art, and the present inventive concept will only be defined by the appended claims.

Figure 1:
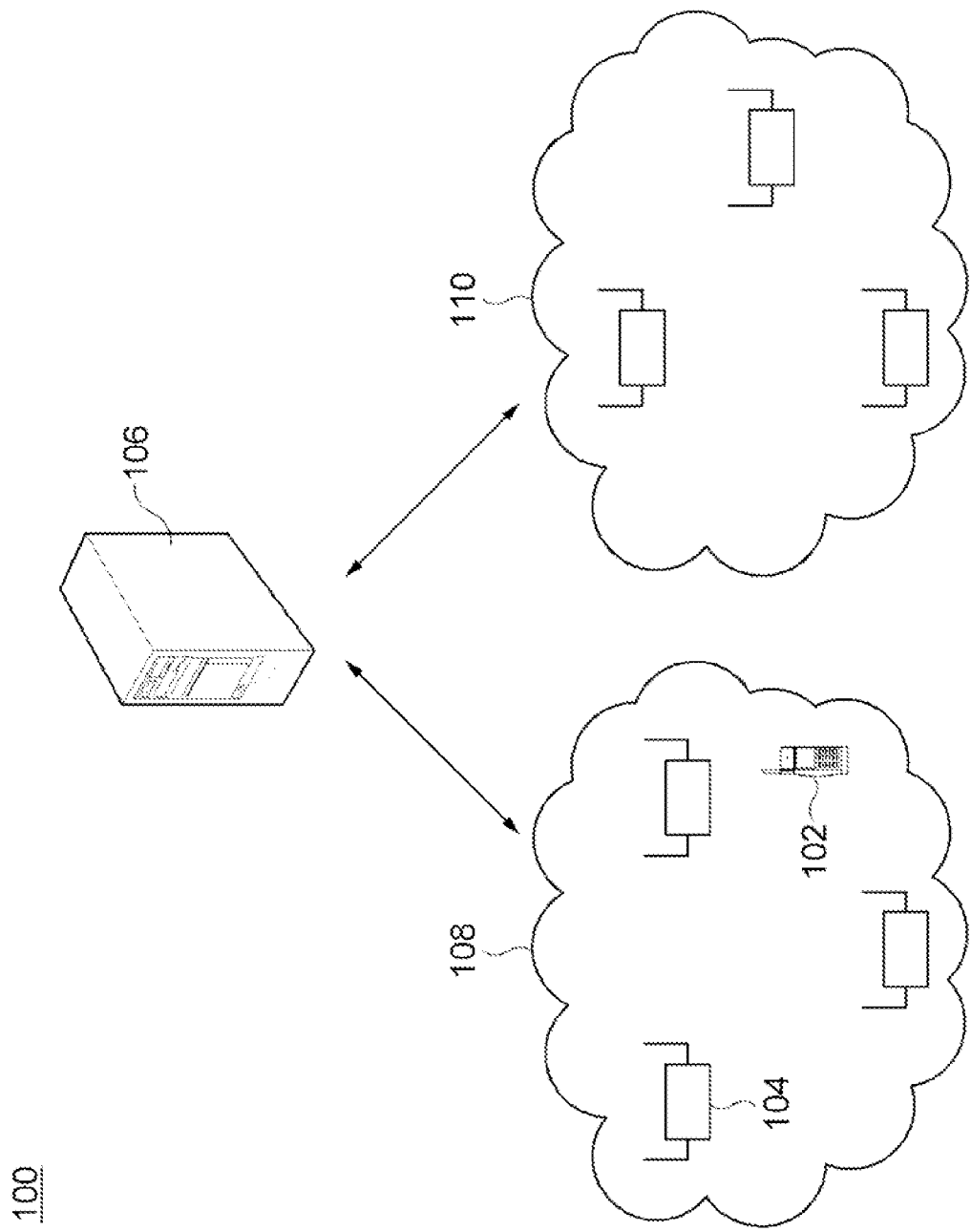
FIG. 1 is an overall configuration diagram of a provisioning system for provisioning a set of handoff parameters, according to an exemplary embodiment.

FIG. 1 is an overall configuration diagram of a provisioning system 100 for provisioning a set of handoff parameters, according to an exemplary embodiment.

As shown, the provisioning system 100 includes a user terminal 102, one or more access points (APs) 104, and a central management server 106. The one or more APs 104, which are generally located in a particular region, form a network 108. In an exemplary embodiment, the network 108 corresponds to a set of APs 104 for which a single set of handoff parameters is applied. A plurality of networks 108 may exist in each region. Shown is an exemplary embodiment in which there are two networks: networks 108 and 110.

In accordance with an exemplary embodiment, handoff parameters are composed of at least one from among the following: a threshold Received Signal Strength Indication (RSSI), a hysteresis margin (i.e., a signal level difference between a serving AP and one of neighboring APs), and a scanning time period for neighboring APs. The set of handoff parameters or handoff parameters may be even more inclusive, depending on the network configuration, so as to support seamless communication for a user in service who moves from the serving AP to one of its neighboring APs.

The user terminal 102 is provided a wireless communication service through the AP 104. The user terminal 102 may comprise, for example, and one of a mobile phone, a personal digital assistant (PDA), a smart phone, a tablet computer, a notebook computer, and the like. Regardless of a type, any device which connecting to or communicating with the AP 104 may be used as the user terminal 102. In general, the user terminal 102 may be designed to have mobility. In general, the user terminal 102 is connected to the AP 104 that is located closest to a current location of the user terminal 102 or has highest received signal strength. In the exemplary embodiment of FIG. 1, an example in which the user terminal 102 is connected to the AP 104 constituting the network 108 is shown.

If the user terminal 102 recognizes the AP 104, the user terminal 102 first transmits an authentication request to the AP 104. The authentication request may include a predetermined type of information necessary for a network service provider to authenticate the user terminal 102, such as an ID/password pair or a media access control (MAC) address. Since authentication of a user in a communication network is well known to those skilled in the art, detailed description thereof is omitted here.

If the user terminal 102 has been successfully authenticated according to the authentication request, the user terminal 102 receives a set of handoff parameters transmitted from the AP 104 for a handoff within the network 108. The set of handoff parameters generally includes a reference value necessary for the user terminal 102 to determine a handoff time in a network. The set of handoff parameters may include one or more of a received signal strength indication (RSSI), a hysteresis margin, a scanning time period of neighboring APs, or any parameter related to a radio wave signal which is measurable between the user terminal 102 and the AP 104. In general, sets of handoff parameters may differ one from another across networks 108 and 110, for example, according to various network deployment factors such as a feature of each AP constituting a network, a geographical feature of a region, and a position and an installation interval of installed APs, even when the service is provided by the same provider. According to an exemplary embodiment, it is possible to dynamically provision a region-specific set of optimum handoff parameters suitable for a network when the user terminal 102 newly enters the network. Therefore, in this exemplary embodiment, there is no need for the user terminal 102 to upgrade firmware to receive a new region-specific set of handoff parameters or store it in the user terminal 102. As described above, if the user terminal 102 receives a set of handoff parameters from the AP 104, the user terminal 102 may perform a handoff between APs within the network 108 based on the set of received handoff parameters.

The set of network-specific handoff parameters as described above may be preset by operators of region-specific networks. That is, each region-specific network operator may calculate a set of handoff parameters suitable for network features using separate terminals, and upload the obtained parameters to the central management server 106 (described below). The set of handoff parameters may be calculated and uploaded (i.e., updated) every time the AP 104 is added to or removed from a regional network, or every time a regional feature of a network changes.

The AP 104 provides a wireless network service to the connected user terminal 102. As described above, the one or more APs 104 located in the same region or adjacent regions constitute a network, and the same set of handoff parameters for the handoff is applied within the network.

If an authentication request is received from the user terminal 102 which is newly entering the network 108, the AP 104 transmits the received authentication request to the central management server 106. If an authentication response corresponding to the authentication request is received from the central management server 106, a connection of the user terminal 102 is permitted or interrupted (i.e., blocked) according to the authentication response. In addition, if the user terminal 102 has been successfully authenticated, the AP 104 receives a set of handoff parameters of the network 108 to which the AP 104 belongs from the central management server 106, and transmits the set of handoff parameters to the user terminal 102.

The central management server 106 manages the overall network service to be provided through APs belonging to each network. That is, the APs belonging to the network are controlled by the central management server 106.

If an authentication request originating from the user terminal 102 is received from the AP 104, the central management server 106 authenticates the user and/or the terminal 102 according to the authentication request and transmits an authentication response to the AP 104 according to a result of the authentication. Because the authentication of the user and/or the terminal 102 in a wireless network service as described above is well known in the related art, detailed description thereof is omitted here.

The central management server 106 stores and manages a number of network-specific sets of handoff parameters, for example, in a database or other data storage mechanism. As described above, the network-specific sets of handoff parameters are updated by network operators and managed by the central management server 106 on the whole. If the user terminal 102 has been authenticated according to the authentication request received through the AP 104, the central management server 106 transmits a set of handoff parameters corresponding to the network in which the AP 104 resides. At this time, the central management server 106 may recognize the network 108 to which the user terminal 102 currently connects by identifying the AP 104, for example, by using a network address of the AP 104 transmitting the authentication request. The network address may include, for example, an Internet protocol (IP) address, a media access control (MAC) address, or the like, of the AP 104.

The set of handoff parameters may be transmitted to the AP 104 by various methods. For example, the central management server 106 may transmit the set of handoff parameters to the AP 104 by adding the set of handoff parameters to the authentication response for the authentication request received from the AP 104 in a piggyback mode. Alternatively, the central management server 106 may transmit the set of handoff parameters by forming a separate session with the AP 104 after transmitting the authentication response for the authentication request received from the AP 104. In addition, the central management server 106 may broadcast the set to each AP belonging to the network 108. The set of handoff parameters may be 1) periodically or aperiodically broadcast according to a preset time interval, 2) broadcast according to a request of the AP 104, or 3) broadcast every time a preset handoff threshold parameter is changed.

If the set of handoff parameters is transmitted from the central management server 106 to the AP 104 by using one of the above-described methods, the AP 104 transfers the set of handoff parameters to the user terminal 102. The user terminal 102 applies the set of handoff parameters to a handoff within the network as necessary.

Figure 2:
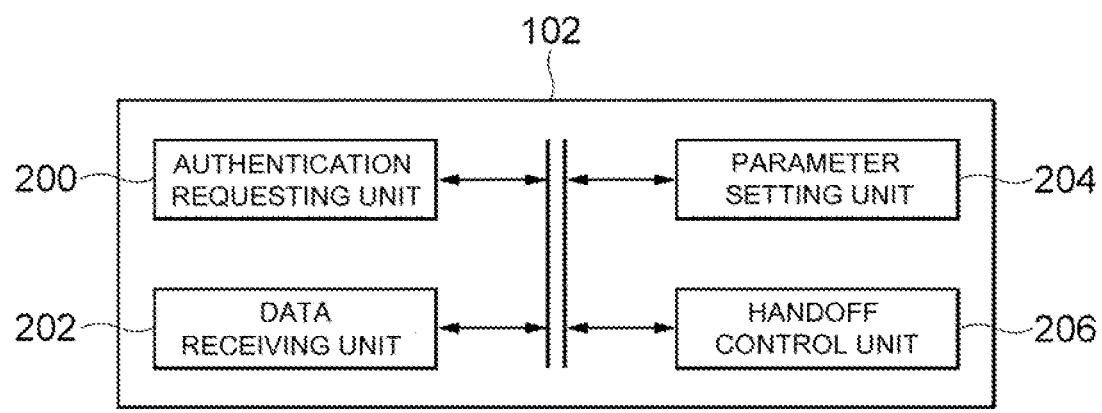
FIG. 2 is a configuration block diagram of a user terminal according to an exemplary embodiment.

FIG. 2 is a configuration block diagram of the user terminal 102 according to an exemplary embodiment. As shown, the user terminal 102 includes an authentication requesting unit 200, a data receiving unit 202, a parameter setting unit 204, and a handoff control unit 206.

The authentication requesting unit 200 transmits an authentication request originating from the user terminal 102 to the AP 104.

If the authentication of the user terminal 102 is completed according to the authentication request, the data receiving unit 202 receives a set of handoff parameters corresponding to the network 108 from the AP 104.

The parameter setting unit 204 configures a set of handoff parameters for a handoff between APs within the network 108 from the data receiving unit 202.

The handoff control unit 206 controls a handoff between the APs belonging to the network 108 according to the set of handoff parameters by the data setting unit 204.

Figure 3:
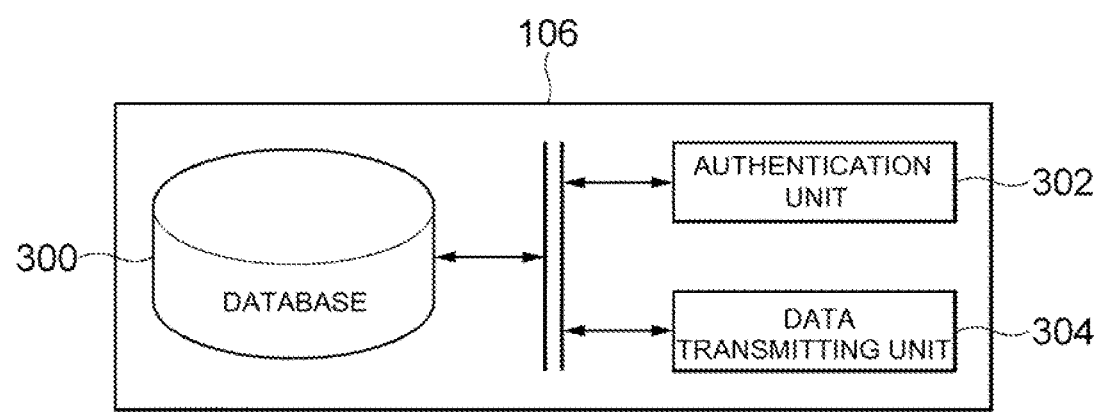
FIG. 3 is a configuration block diagram of a central management server according to an exemplary embodiment.

FIG. 3 is a configuration block diagram of the central management server 106 according to an exemplary embodiment. As shown, the central management server 106 includes a database 300, an authentication unit 302, and a data transmitting unit 304.

The database 300 stores a plurality of sets of handoff parameters for a corresponding plurality of networks connected to the central management server 106. For example, a set of handoff parameters of a particular network may be measured and calculated by the respective network operator and transmitted to the central management server 106.

The authentication unit 302 receives an authentication request from the user terminal 102 via the AP 104, and authenticates the user and/or the terminal 102 according to the received authentication request.

The data transmitting unit 304 extracts a set of handoff parameters of a network to which the user terminal 102 currently connects from the database 300, and transmits the set to the user terminal 102 via the AP 104.

At this time, the data transmitting unit 304 may identify the network by identifying the AP 104 which transmits the authentication request originating from the user terminal 102 by using a network address of the AP 104, such as, for example, an IP address, a MAC address, or the like, of the AP 104. The data transmitting unit 304 then extracts the set of handoff parameters corresponding to the identified network 108 from the database 300.

In addition, as described above, the set of handoff parameters may be transmitted to the AP 104 by various methods. For example, the data transmitting unit 304 may transmit the set of handoff parameters to the AP by adding or appending the set of handoff parameters to the authentication response for the authentication request received from the AP 104 in a piggyback mode. Alternatively, the data transmitting unit 304 may transmit the set of handoff parameters by forming a separate session with the AP 104 after transmitting the authentication response for the authentication request received from the AP 104. In addition, the data transmitting unit 304 may broadcast the set of handoff parameters to each AP belonging to the network 108.

FIG. 4 is a sequence diagram illustrating a provisioning method 400 for provisioning an adaptive set of handoff parameters according to an exemplary embodiment.

In operations 402 and 404, when the user terminal 102 enters a new network 108, the user terminal 102 recognizes an AP 104 belonging to the network 108 and transmits an authentication request to the AP 104.

In operation 406, the AP 104 transmits the received authentication request to the central management server 106, and, in operation 408, the central management server 106 receives the authentication request and authenticates the user terminal 102 according to the received authentication request.

In operation 410, if the user terminal 102 has been successfully authenticated in operation 408, the central management server 106 provides the user terminal 102 with a set of handoff parameters corresponding to the network 108, along with an authentication response for the user terminal 102. However, if the authentication for the user and/or the terminal 102 has failed in operation 408, the central management server 106 interrupts or blocks a network connection of the user and/or the terminal 102.

In operation 410, the central management server 106 may use a network address of the AP 104 transmitting the authentication request so as to identify the network 108 currently connected to the user terminal 102. That is, the central management server 106 may identify the network 108 to which the AP 104 belongs by using a network address such as an IP address or a MAC address of the AP 104, and thereby transmit a set of handoff parameters corresponding to the identified network to the user terminal.

In addition, as described above, the set of handoff parameters may be included in the authentication response corresponding to the authentication request and transmitted to the AP 104. Alternatively, the set of handoff parameters may be transmitted to the AP 104 by forming a separate session with the AP 104 or transmitted to the AP 104 in a broadcasting mode.

In operation 412, if the set of handoff parameters is transmitted from the central management server 106, the AP 104 transmits the received handoff threshold parameter to the user terminal 102, and, in operation 414, the user terminal 102 sets the handoff parameters for a handoff between APs within the network 108 and performs a handoff between the APs based on the configured set of parameters.

According to the exemplary embodiments, it is possible to perform a handoff between APs within a wireless network reflecting to a regional feature in a way of constantly providing a set of optimum handoff parameters without a separate firmware update operation by the user.

It will be apparent to those skilled in the art that various modifications can be made to the above-described exemplary embodiments of the present inventive concept without departing from the spirit or scope thereof. Thus, it is intended that the present disclosure covers all such modifications provided they come within the scope of the appended claims and their equivalents.

What is claimed is:

1. A system for setting an adaptive set of handoff parameters, comprising:
   a user terminal configured to transmit an authentication request to a network and to receive a set of handoff parameters from the network;
   a first access point (AP) belonging to the network and configured to receive the authentication request from the user terminal, transmit the authentication request to a central management server, receive the set of handoff parameters of the network from the central management server, and transmit the set of handoff parameters to the user terminal; and
   the central management server, which is configured to store and manage a plurality of network-specific sets of handoff parameters for one or more networks, authenticate the user terminal using the authentication request received from the first AP, and transmit, to the first AP, the set of handoff parameters of the network to which the authenticated user terminal transmits the authentication request.

2. The system of claim 1, wherein the user terminal is further configured to perform a handoff between the first AP and a second AP within the network by using the received set of handoff parameters.

3. The system of claim 1, wherein the received set of handoff parameters includes at least one from among a received signal strength indication (RSSI), a hysteresis margin, and a scanning time interval relating to APs neighboring the first AP.

4. The system of claim 1, wherein the central management server is further configured to identify the network to which the user terminal transmits the authentication request based on a network address of the first AP.

5. The system of claim 1, wherein the central management server is further configured to transmit the set of handoff parameters to the first AP by appending the set of handoff parameters to an authentication response corresponding to the authentication request received from the first AP.

6. The system of claim 1, wherein the central management server is further configured to transmit the set of handoff parameters to the first AP by forming a separate session with the first AP after transmitting, to the first AP, an authentication response corresponding to the authentication request received from the first AP.

7. The system of claim 1, wherein the central management server is further configured to broadcast the set of handoff parameters to at least a second AP belonging to the network.

8. A user terminal comprising:
   an authentication requesting unit configured to transmit an authentication request to a first access point (AP) residing in a network;
   a data receiving unit configured to receive a set of handoff parameters relating to the network from the first AP when the user terminal is authenticated according to the authentication request;
   a parameter setting unit configured to set the received set of handoff parameters for a handoff between the first AP and a second AP within the network; and
   a handoff control unit configured to perform the handoff between the first AP and the second AP according to the set of handoff parameters set by the parameter setting unit.

9. The user terminal of claim 8, wherein the received set of handoff parameters includes at least one from among a received signal strength indication (RSSI), a hysteresis margin, and a scanning time interval relating to APs neighboring the first AP.

10. A method of setting an adaptive set of handoff parameters, the method comprising:
    receiving an authentication request originating from a user terminal;
    authenticating the user terminal according to the received authentication request; and
    transmitting a set of handoff parameters relating to a network to which the user terminal connects when the user terminal is authenticated,
    wherein transmitting the set of handoff parameters includes identifying the network to which the user terminal connects based on a network address of an access point (AP) from which the authentication request is received, extracting the set of handoff parameters corresponding to the identified network from a database, and transmitting the extracted set of handoff parameters to the user terminal.

11. The method of claim 10, wherein the network address includes at least one from among an IP address and a MAC address.

12. The method of claim 10, wherein the extracted set of handoff parameters is transmitted to the user terminal by way of the AP from which the authentication request is received.

13. The method of claim 12, wherein authenticating the user terminal further comprises generating an authentication response corresponding to the authentication request, wherein the authentication response includes the extracted set of handoff parameters, and wherein the authentication response is transmitted to the AP.

14. The method of claim 12, wherein the transmitting the set of handoff parameters includes forming a separate session with the AP after transmitting an authentication response corresponding to the authentication request to the AP.

15. The method of claim 12, further comprising broadcasting the set of handoff parameters to at least one additional AP belonging to the network.

16. A method of setting an adaptive set of handoff parameters, the method comprising:
    transmitting an authentication request to a first access point (AP) residing in a network;
    receiving a set of handoff parameters relating to the network from the first AP;
    setting handoff parameters for a handoff between the first AP and a second AP within the network based on the received set of handoff parameters; and
    performing a handoff between the first AP and the second AP according to the set handoff parameters,
    wherein the first AP is configured to receive the transmitted authentication request, transmit the authentication request to a central management server, receive the set of handoff parameters of the network from the central management server, and transmit the set of handoff parameters.

17. The method of claim 16, wherein the received set of handoff parameters includes at least one from among a received signal strength indication (RSSI), a hysteresis margin, and a scanning time interval relating to APs neighboring the first AP.

* * * * *